United States Patent [19]

Rose

[11] Patent Number: 4,530,654
[45] Date of Patent: Jul. 23, 1985

[54] INJECTION MOLDING PERIPHERAL OPENING CORE RING GATE

[75] Inventor: Thomas J. Rose, Stow, Ohio
[73] Assignee: Mold-Masters Limited, Georgetown, Canada
[21] Appl. No.: 614,854
[22] Filed: May 29, 1984
[51] Int. Cl.³ .............................................. B29F 1/03
[52] U.S. Cl. .................... 425/566; 425/548; 425/DIG. 224
[58] Field of Search ............... 425/542, 548, 549, 566, 425/567, DIG. 224

[56] References Cited

U.S. PATENT DOCUMENTS

| 3,553,788 | 1/1971 | Putkowski | 425/548 X |
| 3,800,027 | 3/1974 | Tsutsumi | 425/549 X |
| 3,947,177 | 3/1976 | Eckardt | 425/DIG. 224 |
| 4,238,182 | 12/1980 | Mollier | 425/549 X |
| 4,268,240 | 5/1981 | Rees et al. | 425/549 X |
| 4,286,941 | 9/1981 | Gellert | 425/566 |

Primary Examiner—J. Howard Flint, Jr.
Attorney, Agent, or Firm—Riches, McKenzie & Herbert

[57] ABSTRACT

This invention relates to an improved core ring gated injection molding system. The valve pin has a tip portion which joins a larger diameter stem portion at a tapered shoulder and extends through the cavity into the mold platen on the other side. The tip portion of the valve pin is substantially smaller in diameter than the gate through the cavity plate, thus providing for the flow of melt through the gate around it when the valve pin is in the retracted open position. In the forward closed position, the tapered shoulder seats in the gate to provide a seal. By providing for operation in reverse directions to previous core ring gated systems, this increases cooling to the mold platen in the closed position and decreases it in the open position.

5 Claims, 2 Drawing Figures

INJECTION MOLDING PERIPHERAL OPENING CORE RING GATE

BACKGROUND OF THE INVENTION

This invention relates to valve gated injection molding, and more particularly to an improved system for molding a product such as a plastic gear or wheel with a hole through it.

As is well known in the art, the hole through the product is formed by the valve pin which extends completely through the cavity and into a bore in the movable mold platen on the other side. Systems using this type of gating which is known as core ring gating are described in Japanese laid-open patent application No. 55061438 of Toyokuni Jushi Kogy and the applicant's U.S. patent application Ser. No. 568,048 filed Jan. 4, 1984 entitled "Injection Molding Core Ring Gate System" which is a continuation-in-part of U.S. patent application Ser. No. 470,192 filed Feb. 28, 1983. As described in the applicant's above mentioned application Ser. No. 470,192, this arrangement facilitates cooling of the molded product by transferring heat along the valve pin to the cool movable mold platen. However, in all of these previous systems, the valve pin has a head portion extending from a reduced neck portion which allows the melt to flow into the cavity around the valve pin. This necessarily has the disadvantage that it requires the valve pin to be operated in the reverse direction to a normal valve gated system. In other words, in these previous core ring gated systems, the valve pin must be actuated between a retracted closed position and a forward open position rather than the reverse with normal valve gated systems.

SUMMARY OF THE INVENTION

Accordingly, it is an object of the present invention to at least partially overcome the disadvantages of the previous systems by providing a core ring gated system with a valve pin which is actuated in the normal direction between a forward closed position and a retracted open position.

To this end, in one of its aspects, the invention provides an injection molding system for filling a cavity which is defined between a cavity plate and a movable mold platen to form a molded product with a hole therethrough, having a gate extending through the cavity plate to the cavity, a bore in the movable mold platen which is in alignment with the gate, an elongated valve pin and valve pin actuating mechanism which reciprocates the valve pin between a retracted open position and a forward closed position, and a melt passage which extends through a manifold and around the valve pin to convey pressurized melt from a molding machine to the gate, with the improvement wherein the valve pin has a stem portion and a smaller diameter tip portion which extends in central alignment from a tapered shoulder at the stem portion through the gate and into the bore in the movable mold platen, the tip portion being nearly equal in diameter to the bore in the movable mold platen but substantially smaller in diameter than the gate, whereby in the retracted open position melt flows into the cavity through the gate around the tip portion of the valve pin, and in the forward closed position the tapered shoulder is seated in the gate.

Further objects and advantages of the invention will appear from the following description, taken together with the accompanying drawings.

DESCRIPTION OF THE PREFERRED EMBODIMENT

Figure 1:
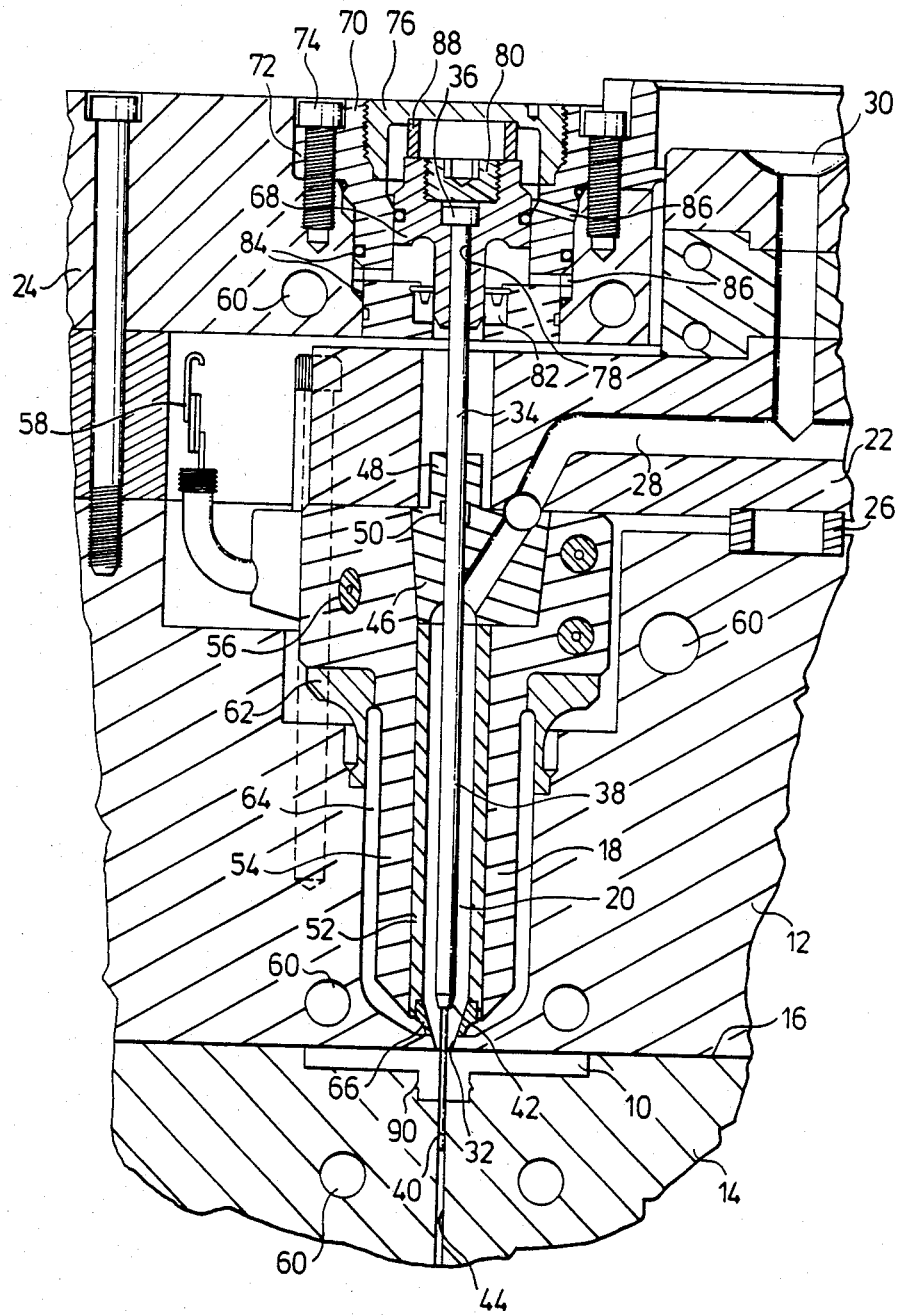
FIG. 1 is a sectional view of a portion of a core ring gated injection molding system according to a preferred embodiment of the invention, showing the valve pin in the retracted open position.

Reference is first made to FIG. 1 which shows one cavity 10 of a multi-cavity core ring gated injection molding system. The cavity is formed between a cavity plate 12 and a movable mold platen 14 which abut along a parting line 16. Each cavity 10 has a heated nozzle 18 seated in the cavity plate 12 with a central bore 20 extending therethrough. A manifold 22 extends between the heated nozzle 18 and a back plate 24 and is accurately positioned relatively to the cavity plate 12 by a locating ring 26. A melt passage 28 branches out through the manifold 22 from a recessed inlet 30 which receives pressurized melt from a molding machine (not shown) and extends through the heated nozzle 18 to a gate 32 leading to the cavity 10.

An elongated valve pin 34 extends through the central bore 20 of the heated nozzle 18 in alignment with the gate 32 and is reciprocated by a hydraulic actuating mechanism seated in the back plate 24. The valve pin has an enlarged driven end 36, a stem portion 38 and a smaller diameter tip portion 40. The tip portion 40 extends in axial alignment from a tapered shoulder 42 at the stem portion 38 through the gate 32 and the cavity 10, and is received in a bore 44 in the movable mold platen 14. The elongated tip portion 40 of the valve pin 34 has a uniform diameter to just fit into the bore 44 in the movable mold platen 14 and prevent leakage of the melt between them. On the other hand, the diameter of the gate 32 is sufficiently larger than that of the tip portion 40 to allow the cavity to fill around the tip portion when the valve pin is in the retracted open position shown in FIG. 1. As many be seen, the melt passage 28 joins the central bore 20 of the heated nozzle 18 in a stainless steel bushing 46 which is seated in the heated nozzle 18 as described in the applicant's U.S. Pat. No. 4,026,518 entitled "Bushing Seal for Valve-Gated Injection Mold" which issued May 31, 1977. The bushing seal 46 has a collar portion 48 extending up around the stem portion 38 of the valve pin to prevent leakage as described in the applicant's U.S. Pat. No. 4,433,969 entitled "Injection Molding Valve Pin Bushing and Method" which issued Feb. 28, 1984. The bushing seal also has a circumferential opening 50 extending around the valve pin which is vented to atmosphere (not shown) to remove harmful gases as described in both of these above mentioned patents.

The nozzle 18 has a corrosion resistant inner portion 52 formed of stainless steel surrounded by a highly conductive outer portion 54 formed of a copper alloy. The nozzle 18 is heated by an electric heating element 56 which is cast into the copper alloy portion and receives electric power from connections (not shown) to terminals 58. The copper alloy rapidly conducts the heat away from the heating element 56 and applies a uniform temperature to the stainless steel portion 52 to maintain the melt at a constant predetermined temperature as it flows through the central bore 20 around the valve pin 34. Of course, the temperature of the melt during the molding cycle is critical to the successful operation of the system. The cavity plate 12, movable mold platen 14 and back plate are cooled by water flowing through cooling elements 60 (or other suitable cooling means). The heated nozzle 18 is seated in the cavity plate 12 on an insulation bushing 62 which provides an insulative air space 64 between them. Similarly, insulative air spaces are provided between the hot manifold 22 and the cooled cavity plate 12 and back plate 24. The air space 64 between the nozzle 18 and the cavity plate 12 is bridged by a hollow nozzle seal 66 formed of a titanium alloy which extends around the gate 32 to prevent the pressurized melt escaping into the air space 64 as described in the applicant's U.S. Pat. No. 4,043,740 entitled "Injection Molding Nozzle Seal" which issued Aug. 23, 1977.

The valve pin actuating mechanism seated in the back plate 24 includes a hydraulically driven piston 68 which reciprocates in a cylinder 70. The cylinder 70 has a collar portion 72 through which bolts 74 extend to secure it in position in the back plate 24 in alignment with the valve pin 34. The cylinder 70 has a removable cap 76 which is larger in diameter than the piston 68 that can be screwed out to remove the piston and valve pin if required. The valve pin 34 extends through a central hole 78 in the piston 68 and a plug 80 is then screwed in against the enlarged driven end 36 of the valve pin to secure it to the piston. A V-shaped high temperature seal 82 extending around the piston and several 0-rings 84 prevent leakage of pressurized hydraulic fluid which is applied through ducts 86 from a conventionally controlled source (not shown).

Figure 2:
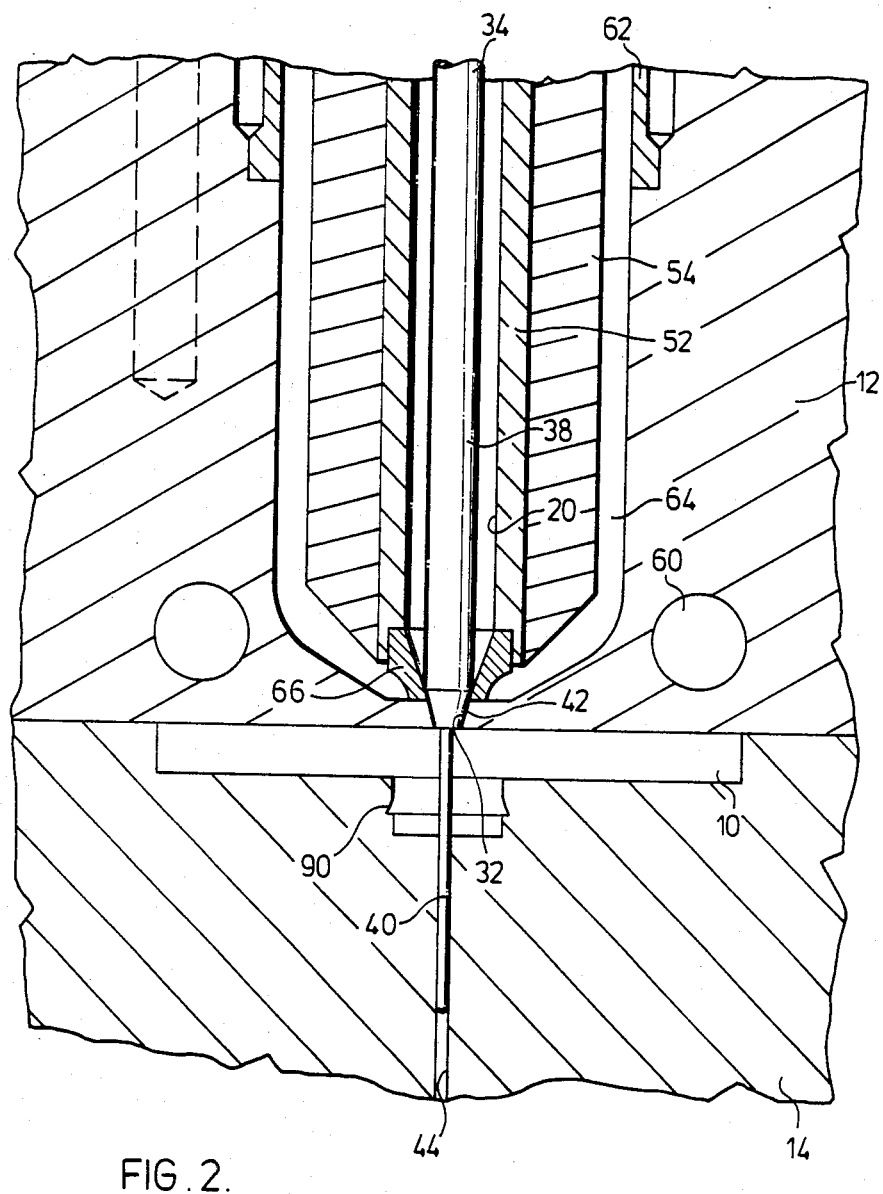
FIG. 2 is an enlarged view of a portion of the system seen in FIG. 1 showing the valve pin in the forward closed position.

In use, following assembly of the system as described above and shown in the drawings, electrical power is applied to the terminals 58 of the heating element 56 and the nozzle 18 is heated to the predetermined operating temperature. Pressurized melt is then introduced into the melt passage 28 from the molding machine according to a predetermined cycle in conjunction with the application of pressurized hydraulic fluid to drive the piston 68. When the piston 68 is driven to the retracted open position shown in FIG. 1, its travel is limited by an abutment sleeve 88 which is located against the cylinder cap 76. In this position, the tapered shoulder 42 at which the tip portion 40 joins the larger diameter stem portion 38 of the valve pin 34 is withdrawn a certain distance from the gate 32. This allows the pressurized melt from the melt passage 28 to flow through the gate 32 around the smaller diameter tip portion 40 and fill the cavity 10. After the cavity 10 is filled with melt, the high injection pressure is held momentarily to pack the melt and the valve pin 34 is then driven to the closed forward position shown in FIG. 2. As many be seen, in this position the tapered shoulder 42 of the valve pin 34 is seated in the tapered gate 32 to seal it before the injection pressure is released. After the melt in the cavity 10 has cooled, the mold is opened along the parting line 16 and the molded product is ejected. In order to withdraw the molded product from the projecting tip portion 40 of the valve pin 34, the cavity 10 may be designed with a slight undercut collar 90 which holds the product on the mold platen 14 as it separates from the cavity plate 12. The product is then dislodged from the mold platen 14 by conventional ejector pins which are not shown. After ejection, the mold is closed again, the valve pin is retracted, injection pressure is reapplied and the sequence is repeated at a rate of several cycles per minute.

As discussed above, the temperature and cooling of the melt during the operating cycle is critical to the satisfactory operation of the system. As described in the applicant's above mentioned U.S. patent application Ser. No. 568,048, the cooling time of a core ring gated system is reduced by the transfer of heat from the melt in the cavity along the valve pin to the cooled mold platen 14. The fact that the present system operates in the reverse direction to the previous core ring gated system further improves this feature. When the valve pin is in the forward closed position in which maximum cooling is required, more of the tip portion 40 is in contact with the cooled mold platen than when the valve pin is in the retracted open position in which less cooling is desired. As mentioned above, the amount of travel of the valve pin between these positions and thus the amount of this difference can be adjusted by changing the height of the abutment sleeve 88. The length of the tip portion 40 of the valve pin 34 and thus the distance it extends into the mold platen will also be selected depending upon the application and the types of material to be molded.

Although the description of this improved core ring gated injection molding system has been given with respect to only a single embodiment, it is not to be construed in a limited sense. Variations and modifications will occur to those skilled in the art. For instance, while the valve pin has been shown and described as being an integral unit, it is apparent that the smaller diameter tip portion could be formed separately and then fixed to the stem portion. Similarly, it is apparent the tip portion 40 of the valve pin 34 could be partially formed of a more conductive material such as copper and/or have a hollow portion adjacent the stem portion to improve the heat flow characteristics as described in the applicant's above mentioned U.S. patent application Ser. No. 568,048. Therefore, for a definition of the invention, reference is made to the attached claims.

What I claim is:

1. In an injection molding system for filling a cavity which is defined between a cavity plate and a movable mold platen to form a molded product with a hole therethrough, having a gate extending through the cavity plate to the cavity, a bore in the movable mold platen which is in alignment with the gate, an elongated valve pin and valve pin actuating mechansim which reciprocates the valve pin between a retracted open position and a forward closed position, and a melt passage which extends through a manifold and around the valve pin to convey pressurized melt from a molding machine to the gate, the improvement wherein the valve pin has a stem portion and a smaller diameter tip portion which extends in central alignment from a tapered shoulder at the stem portion through the gate and into the bore in the movable mold platen, the tip portion being nearly equal in diameter to the bore in the movable mold platen but substantially smaller in diameter than the gate, whereby in the retracted open position melt flows into the cavity through the gate around the tip portion of the valve pin, and in the forward closed position the tapered shoulder is seated in the gate.

2. A system as claimed in claim 1 wherein the gate is tapered to form a seat to sealingly receive the tapered shoulder of the valve pin in the closed position.

3. A system as claimed in claim 2 wherein the tip portion of the valve pin is integrally formed with the stem portion of the valve pin.

4. A system as claimed in claim 2 wherein the tip portion and the stem portion of the valve pin are formed separately and then rigidly joined together in axial alignment.

5. A system as claimed in claim 1 wherein the valve pin is formed of steel.

* * * * *